United States Patent

[11] 3,610,835

[72] Inventor George Paul Reid
Holmdel, N.J.
[21] Appl. No. 20,235
[22] Filed Mar. 17, 1970
[45] Patented Oct. 5, 1971
[73] Assignee Bell Telephone Laboratories, Incorporated
Murray Hill, N.J.

[54] LOUDSPEAKING TELEPHONE
4 Claims, 1 Drawing Fig.

[52] U.S. Cl. .......... 179/81 B, 179/1 VC, 179/170.8
[51] Int. Cl. .......... H04b 1/64, H04m 1/60
[50] Field of Search .......... 179/1 VC, 1 HF, 1 P, 81 B, 170.2, 170.8

[56] References Cited
UNITED STATES PATENTS

| | | | |
|---|---|---|---|
| 2,829,201 | 4/1958 | Kass | 179/1 P |
| 3,321,581 | 5/1967 | Zryd | 179/1 VC |
| 3,363,061 | 1/1968 | Gardner | 179/1 P |
| 3,395,255 | 7/1968 | Clement | 179/1 VC |

*Primary Examiner*—Kathleen H. Claffy
*Assistant Examiner*—William A. Halvcstine
*Attorneys*—R. J. Guenther and Kenneth B. Hamlin

ABSTRACT: A circuit is added to a loudspeaking telephone for preventing the telephone form locking in its receive mode in response to high-amplitude received noise whenever the volume control is adjusted to a high setting. This additional circuit controls a variable impedance device of a receiving channel of the telephone without affecting a variable impedance of a transmitting channel thereof. The circuit increases loss in the receiving channel when the amplitude of translated received noise is greater than the amplitude of translated received noise is greater than the amplitude of translated received speech. The increased loss is switched out of the receiving channel when the amplitude of translated received speech exceeds the amplitude of translated received noise.

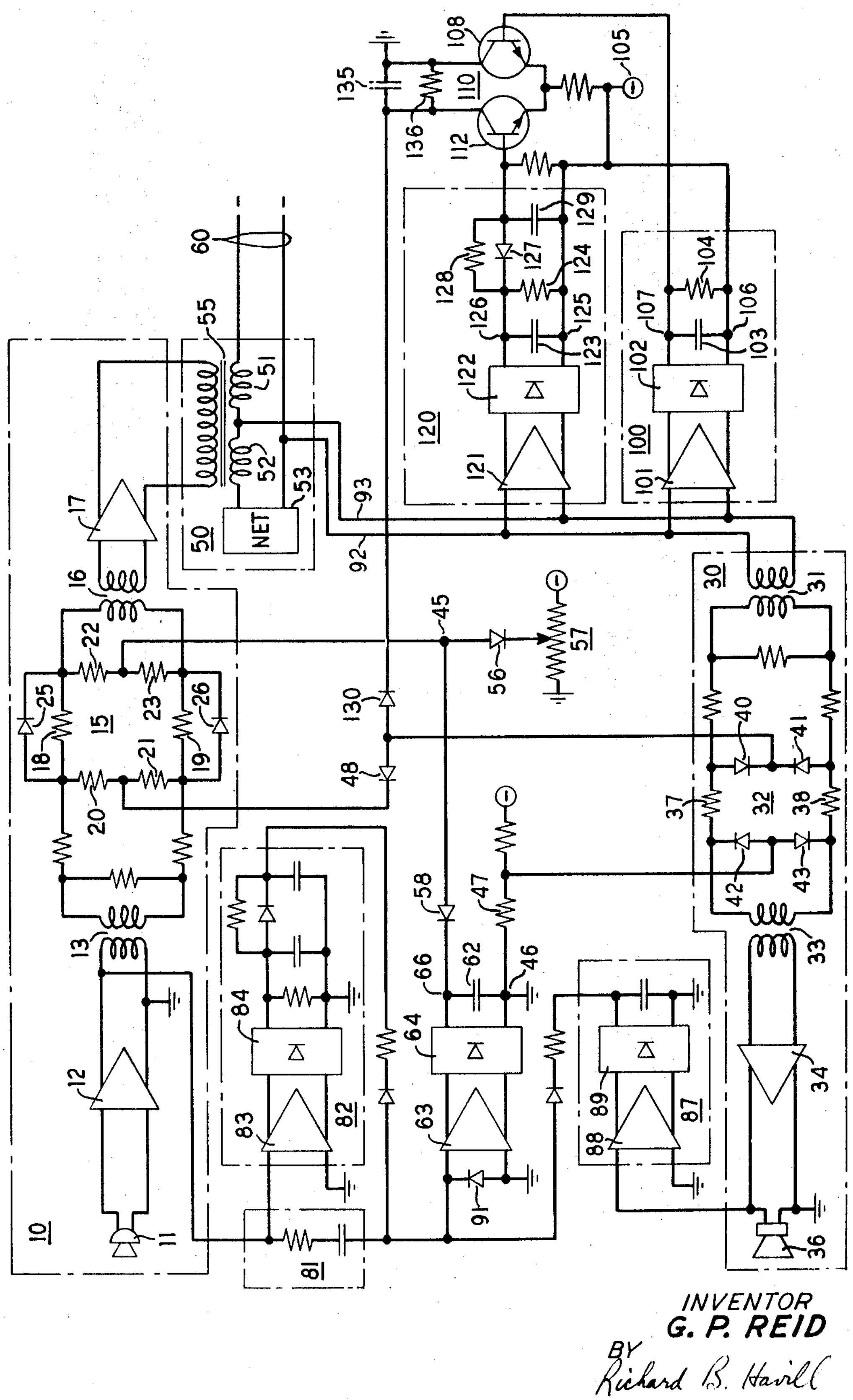
INVENTOR
G. P. REID
BY Richard B. Havill
ATTORNEY

LOUDSPEAKING TELEPHONE

BACKGROUND OF THE INVENTION

1. Field of the Invention

The invention is a loudspeaking telephone wherein attenuation is voice-switched between a transmitting channel and a receiving channel in response to the relative amplitudes of energy propagating through the transmitting and receiving channels.

2. Description of the Prior Art

It is well known that a loud speaking telephone set, or speakerphone, includes a transmitting channel and a receiving channel for transferring audible messages between local and remote subscribers. A microphone included in the transmitting channel and a loudspeaker included in the receiving channel acoustically link the speakerphone with a local subscriber positioned within the room occupied by the speakerphone. Many control circuits are known for isolating the transmitting channel from the receiving channel during operation so that singing and echo are suppressed during operation. A successful one of these circuits is a voice-controlled switching circuit in which a function of the energy propagating through the transmitting channel and of the energy propagating through the receiving channel determines whether the speakerphone operates in its transmitting mode or in its receiving mode at any particular time. In response to a control current that is proportional to the aforementioned function, the switching circuit transfers, or switches, loss from the transmitting channel to the receiving channel and vice versa to change from one operating mode to the other.

One example of an arrangement embodying voice-controlled switching is disclosed in U.S. Pat. No. 3,171,901, issued March 2, 1965 to W. F. Clemency and W. D. Goodale, Jr.

Additional descriptive material of such arrangement is disclosed on pages 649–668 of the Bell System Technical Journal issued in May 1961.

A problem arises in the aforementioned prior art voice-controlled switching circuit when high-level noise is coupled from the telephone line to the receiving channel while the local subscriber is trying to talk. At such a time, the local subscriber's transmitted speech signals may be either clipped or completely blocked from being transmitted to the remote subscriber because of switching hysteresis caused by the high-level noise. When the transmitted speech is clipped or blocked, the remote subscriber usually complains to the local subscriber about faulty transmission; and the local subscriber attempts to overcome the fault by increasing the volume setting of his speakerphone.

The problem of clipping and blocking of transmitted speech signals is aggravated if the local subscriber then turns up the volume control of his speakerphone because an increased volume setting increases the hysteresis effect in the voice-switching characteristic of his speakerphone. Any increased hysteresis effect increases the transmitted speech level required to switch the speakerphone from the receiving mode to the transmitting mode thereby aggravating the clipping or blocking problem.

Thus there exists a need for a speakerphone control circuit which will prevent the speakerphone from clipping and blocking transmitted speech in response to higher than normal received noise. Prevention off such clipping and blocking will also prevent the local subscriber from unintentionally aggravating clipping and blocking by turning up the volume control of his speakerphone when received noise is higher than normal.

SUMMARY OF THE INVENTION

It is therefore an object of the invention to reduce the clipping and blocking of transmitted speech signals in a loudspeaking telephone that is receiving a high level of noise from a connecting telephone circuit.

It is another object to change the voice-switching characteristic of a prior art loudspeaking telephone by reducing the effect that high-level received noise has on the characteristic.

These and other objects of the invention are realized in an illustrative embodiment thereof in which a loudspeaking telephone includes a control circuit for changing attenuation in the receiving channel. This control circuit translates received noise into a signal that regulates a component of control current that is coupled through a variable attenuation means of the receiving channel. This control circuit also translates a received speech signal and compares the amplitude of the translated speech signal with the amplitude of the translated noise. A circuit coupling the noise regulated component of control current into the receiving channel variable attenuation means is disabled when the amplitude of the translated speech signal exceeds the amplitude of the translated noise.

A feature of the invention is a circuit translating received noise into a signal regulating a component of control current that is coupled to a variable attenuation means of the receiving channel for varying the attenuation thereof.

Another feature is a circuit that increases the loss of the variable attenuation means of the receiving channel in response to increased received noise.

Another feature is a comparator which disables the coupling of the noise component of the control current to the variable attenuation means of the receiving channel when the amplitude of translated received speech exceeds the amplitude of translated received noise.

BRIEF DESCRIPTION OF THE DRAWING

A better understanding of the invention may be derived from the detailed description following if that description is considered with respect to the attached drawing which is a schematic diagram of the invention.

DETAILED DESCRIPTION

Referring now to the drawing, there is shown an illustrative embodiment of a local loudspeaking telephone station which includes a transmitting channel 10, a receiving channel 30, and a hybrid circuit 50 for electrically coupling the channels 10 and 30 to a telephone line 60 that extends to a remote telephone station, not shown.

The transmitting channel 10 includes a microphone 11 coupled by way of an amplifier 12, a transformer 13, a current-controlled variable impedance device 15, a transformer 16, and an amplifier 17 to the hybrid circuit 50.

Variable impedance device 15 is a balanced arrangement that includes a pair of resistors 18 and 19, respectively connected in series with the channel conductors, and two additional pairs of resistors 20, 21 and 22, 23, respectively connected across the transmitting channel conductors at opposite ends of the resistors 18 and 19.

The variable impedance device 15 also includes diodes 25 and 26, respectively bridged across the resistors 18 and 19 in series with the channel conductors. Impedance of the diodes 25 and 26 varies inversely with respect to the magnitude of direct current conducted therethrough. The balanced arrangement of the variable impedance device 15 cancels effects of transients in a control current conducted through the device 15 so that those transients are not superimposed on signals being transmitted through the transmitting channel 10 to the hybrid circuit 50.

Hybrid circuit 50 contains a conventional bridge circuit having four arms, respectively including a coil 51, a coil 52, a balancing network 53, and the telephone line 60. The balancing network 53 is a self-balancing network conventionally used in telephone circuits for matching the impedance of the telephone line 60. Energy propagating along transmitting channel 10 is coupled through a transformer 55 to a first pair of diametrically opposite junctions in the hybrid circuit and located at the extreme opposite ends of the coils 51 and 52. Energy propagating along the telephone line 60 from the remote station, not shown, is coupled by way of a second pair of diametrically opposite junctions of the bridge circuit in the hybrid circuit 50 through a pair of leads and a primary winding of a transformer 31 to the receiving channel 30.

The receiving channel 30 includes the transformer 31 which is coupled by way of a current-controlled variable impedance device 32, a transformer 33, and an amplifier 34 to a loudspeaker 36.

The variable impedance device 32 is another balanced arrangement that includes resistors 37 and 38, respectively connected in series with the receiving channel conductors. Variable impedance device 32 also includes two pairs of diodes, each pair being bridged across the receiving channel conductors at opposite ends of the resistors 37 and 38. One pair of diodes 40 and 41 have their cathodes connected together while the other pair of diodes 42 and 43 have their anodes connected together.

Diodes 40 through 43 are poled to conduct control current through the variable impedance device 32 in an arrangement that cancels the effects of transients in control current conducted through the device 32 so that those transients are not superimposed on signals being transmitted through the receiving channel 30 to the speaker 36. The diodes 40 through 43 have impedance characteristics that are similar to the impedance characteristics of the diodes 25 and 26.

Diodes 25, 26, and 40 through 43 are linked together in a direct-current control path that is energized by potential developed between reference ground and a junction 45. The direct-current path is formed by a circuit extending from ground at a terminal 46 through a resistor 47 to a junction between the anodes of diodes 42 and 43 of the variable impedance device 32. The direct-current path continues through the diodes 42 and 43, the resistors 37 and 38, the diodes 40 and 41, and a diode 48 to a junction between the resistors 20 and 21 in the variable impedance device 15. The direct-current path continues further through the resistors 20 and 21, the diodes 25 and 26, and the resistors 22 and 23 to the junction 45. All of the diodes 25, 26, 40, 41, 42, 43, and 48 are poled to conduct forward current in the same direction along the path.

Potential developed between reference ground and the junction 45 is determined by a combination of two branch circuits connected thereto. Each branch circuit includes a diode arranged so that the potential, across the branch having the greater potential drop between reference ground and the junction 45, is coupled to the junction 45.

One of the branch circuits includes a diode 56 connected to an adjustable tap of a volume control potentiometer 57. A source of negative potential is grounded through the resistance of the potentiometer. The negative potential source is shown symbolically as a circle enclosing a minus sign. Here and elsewhere in the drawing this symbol indicates that a negative polarity terminal of a conventional potential source is connected to the indicated point in the circuit and a positive terminal of that source is connected to ground.

Adjustment of the tap of the potentiometer 57 sets a reference potential level at the junction 45 and establishes an initial control current through the aforementioned direct-current control path. This initial control current is conducted from ground at the terminal 46 through the resistor 47, the diodes 42 and 43, the resistors 37 and 38, the diodes 40 and 41, the diode 48, the resistors 20 and 21, the diodes 25 and 26, the resistors 22 and 23, the diode 56, and the potentiometer 57 back to ground. The adjustable tap of the volume control potentiometer 57 is adjusted so that a satisfactory signal level is produced at the loudspeaker 36 when a person speaks into the telephone set located at the remote station, not shown.

A second branch circuit includes another diode 58 and a storage capacitor 62 which is grounded on one side at the terminal 46. Potential developed across the capacitor 62 is determined by a charging circuit including an amplifier 63 and a diode-bridge rectifier 64. The storage capacitor 62 is connected across output terminals 46 and 66 of the rectifier 64. During operation signals produced by the rectifier 64 in response to input signals received from detectors 81, 82, and 87 determine the potential across the capacitor 62. When the potential across the charging capacitor 62 and the diode 58 is greater than the potential across the diode 56 and the potentiometer 57 to ground, the potential across the diode 58 and the capacitor 62 determines the current conducted in the direct-current control path through the variable impedance devices 15 and 32.

Thus the magnitude of the control current is determined initially by the setting of the volume control potentiometer 57 and thereafter by the charge on the capacitor 62. Charge on the capacitor 62 is determined by a function of energy propagating through the transmitting channel and of energy propagating through the receiving channel.

Two previously mentioned detecting circuits 81 and 82 are connected to an output terminal of the transmitting amplifier 12 for sensing energy propagating through the transmitting channel 10. The first detecting circuit 81, including a resistor and a capacitor in series circuit, couples substantially the entire range of audible signals from the amplifier 12 to the input of the amplifier 63. The second detecting circuit 82, including an amplifier 83, a diode bridge rectifier 84, and an output circuit, translates signals from the transmitting amplifier 12 into an output signal that has an amplitude that is substantially proportional to the amplitude of a slowly varying envelope of noise signals from the amplifier 12. This output signal from the detecting circuit 82 also is coupled to the input of the amplifier 63.

The other previously mentioned detecting circuit 87, including an amplifier 88, a rectifier 89, and an output circuit, is connected to an output terminal of the receiving amplifier 34 for sensing energy propagating through the receiving channel 30. The circuit 87 translates the entire range of audible signals propagating through the receiving channel 30 into a direct-current output signal having a magnitude proportional to the energy in the channel 30. The output signal from the detecting circuit 87 is coupled to the input of the amplifier 63 together with the outputs of the detecting circuits 81 and 82.

At the input of the amplifier 63, signals from the detecting circuits 81, 82, and 87 are coupled through a diode 91 to ground. Diode 91 has an impedance character characteristics which is substantially similar to the impedance characteristics of the diodes 25 and 26. Increased direct current through the diode 91, as a result of output signals from the detecting circuits 82 and 87, reduces the effect of input speech signals applied to the input of the amplifier 63 from the detecting circuit 81.

By thus controlling the input to the amplifier 63, the detectors 81, 82, and 87 cause the charge on the capacitor 62 to be a function of energy propagating through the transmitting and receiving channels 10 and 30.

During operation, the speakerphone operates in either one of two modes. In the absence of transmitted and received noise while no one is speaking into the microphone 11, the set operates in its receiving mode wherein the control current, cause by the setting of the volume control potentiometer 57, is low. In this mode, the variable impedance device 15 imparts a high loss to any signals propagating through transmitting channel 10, and the variable impedance device 32 imparts a low loss to signals propagating through receiving channel 30. During operation in such receiving mode, a person at the remote station can speak into his telephone set, and his speech will be reproduced by the speaker 36.

Also in the absence of transmitted and received noise when someone speaks into microphone 11 while no one is speaking into the remote station telephone set, the speakerphone operates in its transmitting mode. Speech signals coupled through the circuit 81 increases the output signal from the control rectifier 64. Such increased signal from the rectifier 64 increases the charge across the capacitor 62. The increased charge in turn increases the current in the control loop. Because the increased control current passes through both of the variable impedance devices 15 and 32 and because of the impedance characteristics of the diodes therein, loss is reduced in the variable impedance device 15 and is increased in the variable impedance device 32. While the speakerphone operates in this transmitting mode, speech directed into the microphone 11 is reproduced by the telephone set at the remote station, not shown.

Thereafter when the person ceases speaking into the microphone 11, the charge across the capacitor 62 and the control current decreases. As a result, loss decreases in the receiving channel variable impedance device 32 and increases in the transmitting channel variable impedance device 15. Thus the speakerphone is returned to its receiving mode.

Increasing loss in the receiving channel while decreasing loss in the transmitting channel and vice versa in response to voice signals generally is referred to as voice-switching of loss, or merely voice-switching.

The detecting circuit 87 changes the threshold for switching loss between the variable impedance devices 15 and 32. For instance, as the circuit 87 produces increased direct current through the diode 91, the input impedance to the amplifier 63 is reduced. Such reduced input impedance reduces the effective gain of the combination of the diode 91, the amplifier 63, and the rectifier 64. As a result greater signal fluctuations are required from the detector 81 to cause a change of the control current through the variable impedance devices 15 and 32.

Because of the characteristics of the circuit 87 and its connection to the diode 91, the circuit 87 prevents the speakerphone from switching from the receiving mode to the transmitting mode in response to speech energy that is acoustically coupled from the loudspeaker 36 to the microphone e 11 while someone is talking into the telephone set at the remote station, not shown. The detector 87 also prevents the speakerphone from switching to the transmitting mode when a high level of noise is coupled through the receiving channel to the input of the detector 87.

The result of the operation of the detecting circuit 87 in response to high-level noise from the output of the amplifier 34 is to reduce the sensitivity of voice-controlled switching by requiring more input speech signal at the microphone 11 for switching the speakerphone from the receive mode to the transmit mode.

To prevent such reduction in sensitivity of voice-controlled switching, two additional detecting circuits are connected in parallel to leads 92 and 93, which connect the hybrid circuit 50 with the receiving channel 30.

A received speech detecting circuit 100 is arranged to translate received speech into an output signal having characteristics similar to output signals of well-known speech detectors. The received speech detecting circuit 100 includes an amplifier 101, a rectifier 102, a capacitor 103, and a resistor 104. The rectifier 102 is a diode bridge rectifier that is similar to the rectifiers 64 and 84. Capacitor 103 and resistor 104 are connected in parallel across the output terminals of the rectifier 102. One of those output terminals 106 is connected to a source of reference potential 105. The other output terminal 107 of the rectifier 102 couples the output signals from the rectifier to a first input at a base electrode of a transistor 108 of a comparator circuit 110. The resistor 104 and the capacitor 103 are proportioned to produce characteristic speech detector output signals from speech signals being received by way of the leads 92 and 93.

A received noise detecting circuit 120 is arranged to translate received noise into an output signal having an amplitude proportional to the amplitude of a slowly varying envelope of the noise received from the hybrid network 50 by way of the leads 92 and 93. Received noise detecting circuit 120 includes an amplifier 121, a rectifier 122, and an output circuit that couples the rectifier 122 to a second input of the comparator circuit 110 at a base electrode of a transistor 112. The rectifier 122 is a diode bridge rectifier that is similar to the rectifiers 64, 84, and 102. The voltage gain $A_{121}$ of the amplifier 121 is greater than the voltage gain $A_{101}$ of the amplifier 101. These voltage gains are related by the function $20 \log_{10} A_{121}/A_{101} = X$, where 5 db. $< X <$ 15 db.

The output circuit of the noise detecting circuit 120 includes a capacitor 123 connected in parallel with a resistor 124 across the output terminals of the rectifier 122. One output terminal 125 of the rectifier 122 is connected to the negative potential source 105 and the other output terminal 126 is coupled by way of a diode 127 and a resistor 128, bridged thereacross, to one terminal of a capacitor 129. The common junction between the diode 27 and the capacitor 129 is connected to base electrode of the transistor 112. The other terminal of the capacitor 129 is connected back to the output terminal 125.

The capacitor 123 is selected to have the same charge-discharge characteristic as the capacitor 103 of the speech detecting circuit 100. Thus the capacitor 123 is charged relatively rapidly by signals coupled through the amplifier 121 and the rectifier 122.

Capacitor 129 is arranged so that it is slowly charged through the resistor 128 during any rise in potential across the capacitor 123. During any fall in potential from the rectifier 122, the capacitor 123 discharges rapidly through resistor 124. Due to the reduced potential at terminal 126, capacitor 129 also discharges rapidly through diode 127 and resistor 124. Thus slowly varying noise signals will build up an output signal across the capacitor 129, but speech signals, which generally vary rapidly, will not build up any substantial output signal across the capacitor 129.

During operation the translated noise output signal produced by the detecting circuit 120 across the capacitor 129 is coupled to the second input of the comparator 110 where the amplitude of the translated noise is compared with the amplitude of the translated speech signal produced by the detector 100. When voltage produced across the capacitor 129 exceeds the voltage across the capacitor 103, the transistor 112 in the comparator 110 is enabled for coupling an additional component of control current into a portion of the direct-current control path. The additional control current thus coupled into the control path is proportional to the amplitude of received noise and is conducted from ground at the terminal 46 through the resistor 47, the variable impedance device 32, a diode 130, and the comparator 110 to the negative potential source 105. Diode 48 blocks such additional control current from being conducted through the transmitting channel variable impedance device 15.

Thus when the received noise increases in amplitude and causes to be applied to the comparator 110 a higher potential than the translated received speech does, the control current increases through the receiving channel variable impedance device 32. This additional control current increases the loss in the device 32. As a result, the received noise propagating through the receiving channel 30 is attenuated, and the noise level applied to the speaker 36 and to the detecting circuit 87 is lower than would be applied thereto in the absence of the increased loss caused by the additional control current. Since the noise level applied to the detecting circuit 87 is lower, less direct current is conducted from the detector 87 through the diode 91, and the input impedance to the amplifier 63 increases. Thus the sensitivity for voice-controlled switching also is increased. As a result the hysteresis effect caused by noise received at the detector 87 is reduced.

As the received noise is attenuated more and more in response to the additional component of control current conducted through the comparator 110, speech signals coupled through the detector 81 begin to cause control current to increase through both of the variable impedance devices 15 and 32. This additional control current caused by speech at the microphone 11 produces further attenuation of received noise in the variable impedance device 32. Once commenced, the above-described process is regenerative so that the speakerphone quickly switches from its receive mode to its transit mode. Then, regardless of the level of noise received over the leads 92 and 93, speech from the subscriber at the local station readily switches the speakerphone from the receive mode to the transmit mode.

Since the operating mode readily switches in response to speech into the microphone 11, the clipping and blocking of the local subscriber's transmitted speech is reduced. Because transmitted speech clipping is reduced, the subscriber at the remote station does not complain to the local subscriber. Thus, the local subscriber refrains from adjusting the volume control 57, and the hysteresis effect in the voice-switching characteristics is not increased.

Diode 130 is a threshold device which conducts only when the translated received noise potential across the capacitor 129 has sufficient amplitude that the transistor 112 is biased to produce on its collector a potential that is more negative than the potential between the anode of the diode 48 and ground. This potential between the anode of the diode 48 and ground is determined substantially by the control current produced in response to the setting of the volume control 57 and the charge on the capacitor 62 as determined by the output signal from the rectifier 64.

A capacitor 135 and a resistor 136 are connected in parallel with each other between the collector of the transistor 112 and ground so that the capacitor 135 charges while the transistor 112 conducts. The capacitor 135 and the resistor 136 are proportioned so that the capacitor 135 slowly discharges in approximately 10–20 milliseconds when the transistor 112 subsequently is disabled. Thus the additional component of control current, conducted through the variable impedance device 32 while the transistor 112 is enabled, decreases slowly commencing when the transistor 112 is disabled.

The comparator circuit 110 disables the conduction of additional control current through the transistor 112 to the negative potential source 105 whenever the voltage of the translated speech, applied to the base electrode of the gate transistor 108 of the comparator 110, exceeds the voltage of the translated noise applied to the transistor 112. Thus when received speech signals cause the higher potential to be applied to the comparator than the received noise causes, the gate transistor 108 is turned on causing the transistor 112 to be disabled. With the transistor 112 disabled, the only additional control current conducted through the variable impedance device 32 is the transient current caused by the discharge of the capacitor 135. As the additional control current decreases through the variable impedance device 32, the loss therein is reduced. Speech signals, then present on the leads 92 and 93, propagate to the speaker 36 and the detector 87. Those signals impart sufficient energy to the speaker 36 to drive the speaker at an acceptable volume. Those speech signals also impart sufficient energy to the detector 87 to prevent the entire speakerphone from switching from the receiving mode to the transmitting mode because of acoustic coupling between the speaker 36 and the microphone 11.

The above detailed description is illustrative of one embodiment of the invention, and it is to be understood that additional embodiments thereof will be obvious to those skilled in the art. The embodiment described herein together with those additional embodiments are considered to be within the scope of the invention.

What is claimed is:

1. In combination
a transmitting channel,
a receiving channel,
means for generating a control signal component in accordance with the signal levels in said channels,
attenuating means individually connected to the transmitting and receiving channels,
means for applying the control signal component from the generating means to the attenuating means of the transmitting and receiving channels,
means connected to the receiving channel for translating noise transmitted through the receiving channel,
means responsive to the translated noise for coupling an additional control signal component to the attenuating means connected to the receiving channel, and
means for disabling the coupling means.

2. A combination in accordance with claim 1 wherein
the disabling means include means gating the coupling means and means connected to the receiving channel for translating a received speech signal,
the speech translating means apply the translated speech signal to the gating means,
the gating means disable the coupling means when the magnitude of the translated speech signal is greater than the magnitude of the translated noise and enable the coupling means when the magnitude of the translated speech signal is less than the magnitude of the translated noise.

3. A combination in accordance with claim 2 wherein
the received speech translating means include means amplifying received speech signals by a predetermined gain, means rectifying amplified received speech signals, and output means charging and discharging at a predetermined rate,
the received noise translating means include means amplifying received noise by a gain that is substantially greater than the predetermined gain, means rectifying amplified received noise, and output means charging substantially slower than the predetermined rate and discharging substantially at the predetermined rate.

4. A loudspeaking telephone circuit comprising
a transmitting channel including means imparting gain that increases in response to increased control current conducted therethrough,
a receiving channel including means imparting gain that decreases in response to increased control current conducted therethrough,
a direct current path conducting a common component of control current through the transmitting and receiving channel gain means, the common component of control current being a function of signal levels in the transmitting and receiving channels,
means translating receiving channel noise into a signal for controlling an additional component of control current proportional to the amplitude of the envelope of the receiving channel noise,
means coupling the additional component of control current through the receiving channel gain means,
means translating a receiving channel speech signal into a signal proportional to the amplitude of the receiving channel speech signal,
means comparing the amplitude of the translated noise with the amplitude of the translated speech, and
means disabling the coupling means in response to the amplitude of the translated speech signal being greater than the amplitude of the translated noise.